(12) United States Patent
Irving

(10) Patent No.: US 7,802,657 B1
(45) Date of Patent: Sep. 28, 2010

(54) GRAVITY ACTUATED TORQUE GENERATOR

(76) Inventor: Ronald D. Irving, 4604 SE. 60th Ave., St. Cloud, MN (US) 56304

( * ) Notice: Subject to any disclaimer, the term of this patent is extended or adjusted under 35 U.S.C. 154(b) by 136 days.

(21) Appl. No.: 12/112,057

(22) Filed: Apr. 30, 2008

(51) Int. Cl.
*F03G 3/08* (2006.01)
(52) U.S. Cl. .......................... 185/28; 185/32
(58) Field of Classification Search ............ 185/27, 185/28, 4, 32; 368/150, 208, 204, 64; 310/36, 310/81; 322/3
See application file for complete search history.

(56) References Cited

U.S. PATENT DOCUMENTS

| | | | | |
|---|---|---|---|---|
| 425,097 A | * | 4/1890 | Friess et al. ............ | 185/27 |
| 471,886 A | * | 3/1892 | Omer .................... | 185/27 |
| 6,220,394 B1 | * | 4/2001 | Hillis ................... | 185/32 |

* cited by examiner

*Primary Examiner*—Richard W Ridley
*Assistant Examiner*—Terence Boes
(74) *Attorney, Agent, or Firm*—David A. Lingbeck

(57) ABSTRACT

A gravity actuated torque generator for generating torque to run a generator by continually adding weights to the apparatus. The gravity actuated torque generator includes a support assembly, a drive assembly being supported by the support assembly, and a weight assembly being engagable to the drive assembly while moving downwardly due to gravitational forces for generating torque.

12 Claims, 2 Drawing Sheets

US 7,802,657 B1

GRAVITY ACTUATED TORQUE GENERATOR

BACKGROUND OF THE INVENTION

1. Field of the Invention

The present invention relates to torque generators and more particularly pertains to a new gravity actuated torque generator for generating torque to run a generator by continually adding weights to the apparatus.

2. Description of the Prior Art

The use of torque generators is known in the prior art. More specifically, torque generators heretofore devised and utilized are known to consist basically of familiar, expected and obvious structural configurations, notwithstanding the myriad of designs encompassed by the crowded prior art which have been developed for the fulfillment of countless objectives and requirements.

The prior art includes shafts such as drive screws being threaded along the lengths thereof with cylindrical weights being dropped about the drive screws effecting rotation of the drive screws while the cylindrical weights having threaded bores do not rotate because of a retaining bar. While these devices fulfill their respective, particular objectives and requirements, the aforementioned patents do not disclose a new gravity actuated torque generator.

SUMMARY OF THE INVENTION

The general purpose of the present invention, which will be described subsequently in greater detail, is to provide a new gravity actuated torque generator which has many of the advantages of the torque generators mentioned heretofore and many novel features that result in a new gravity actuated torque generator which is not anticipated, rendered obvious, suggested, or even implied by any of the prior art torque generators, either alone or in any combination thereof. The present invention includes a support assembly, a drive assembly being supported by the support assembly, and a weight assembly being engagable to the drive assembly for generating torque. None of the prior art includes the combination of the elements of the present invention.

There has thus been outlined, rather broadly, the more important features of the gravity actuated torque generator in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new gravity actuated torque generator which has many of the advantages of the torque generators mentioned heretofore and many novel features that result in a new gravity actuated torque generator which is not anticipated, rendered obvious, suggested, or even implied by any of the prior art torque generators, either alone or in any combination thereof.

Still another object of the present invention is to provide a new gravity actuated torque generator for generating torque to run a generator by continually adding weights to the apparatus.

Still yet another object of the present invention is to provide a new gravity actuated torque generator that powers a generator by the user continually putting weights upon the helical track and about the drive shaft which drives a gear.

Even still another object of the present invention is to provide a new gravity actuated torque generator that generates usable torque by using gravity to move the weights which engage the drive shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
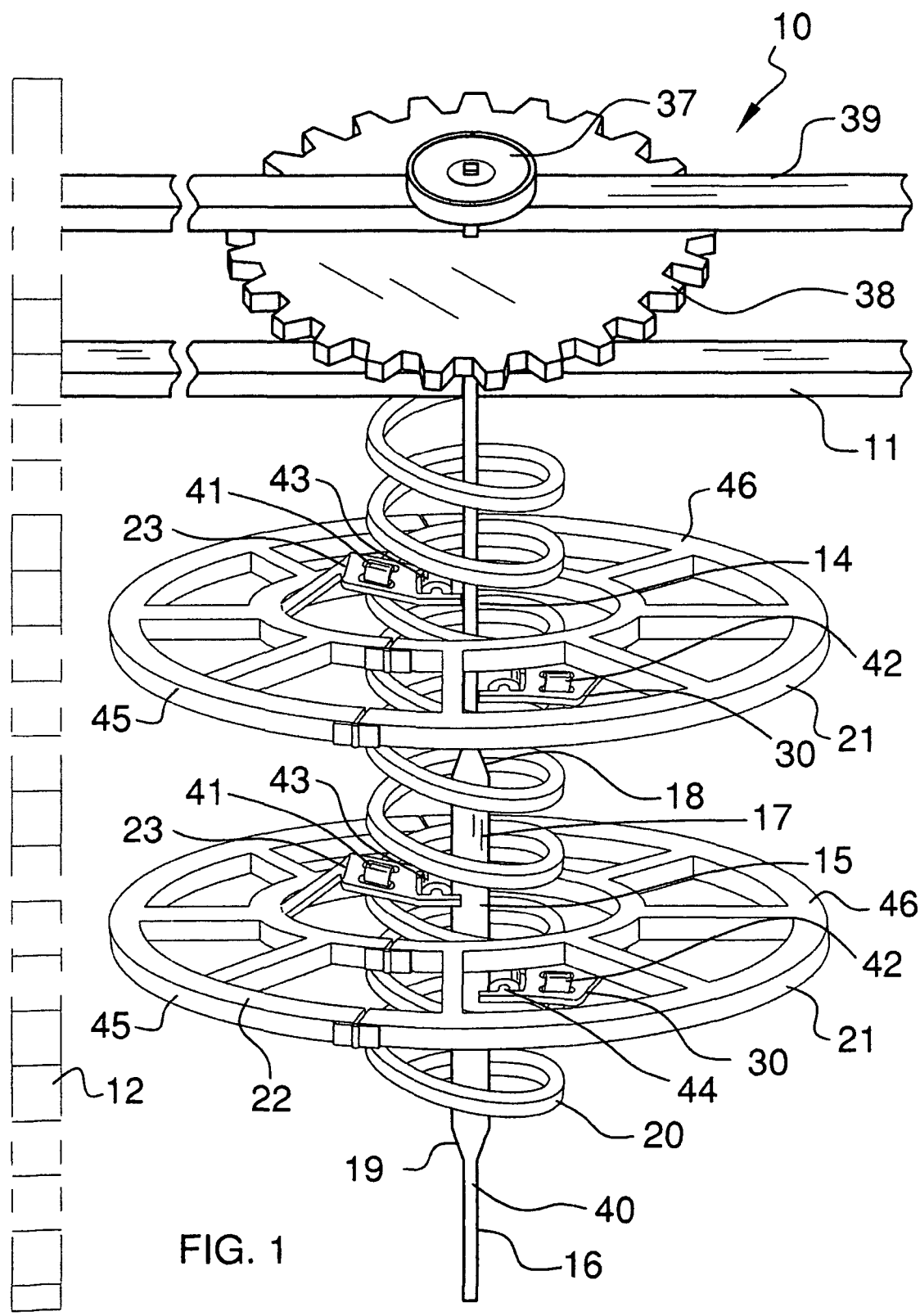
FIG. 1 is top perspective view of a new gravity actuated torque generator according to the present invention.
Figure 2:
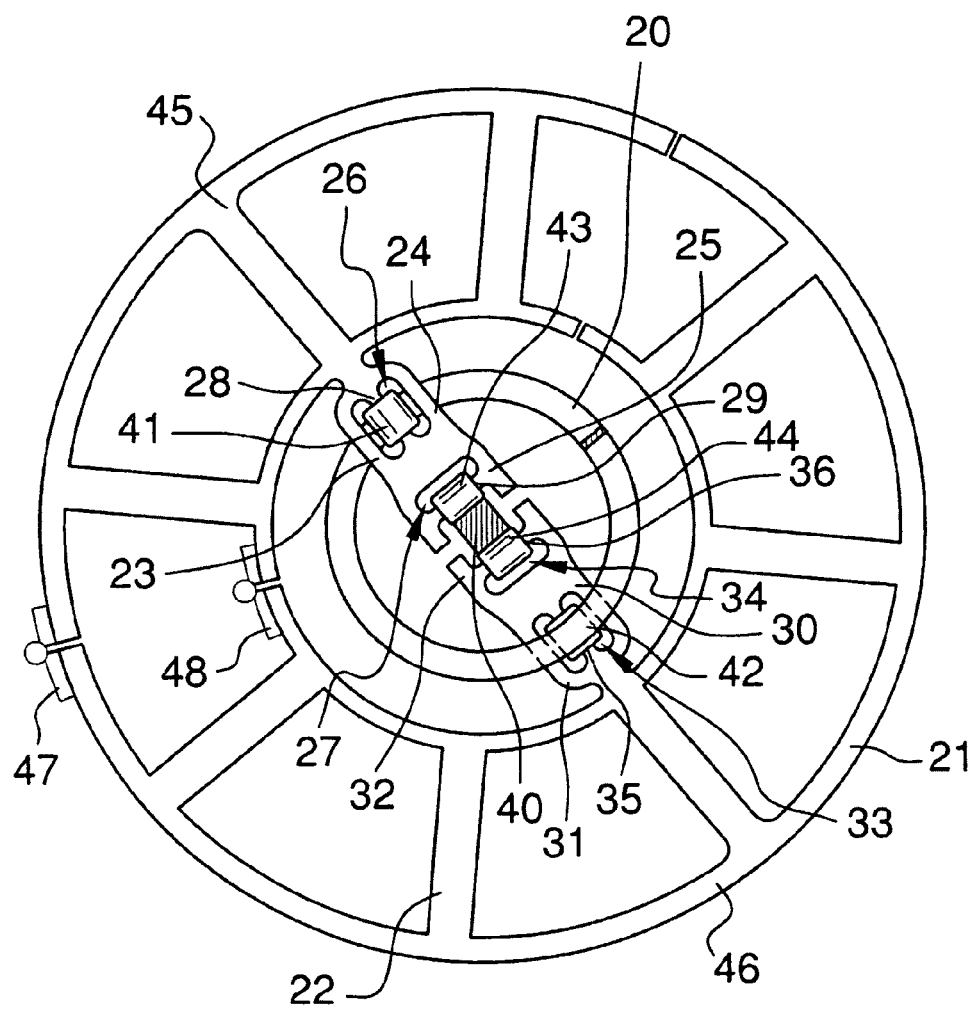
FIG. 2 is a bottom planar view of the present invention.

With reference now to the drawings, and in particular to FIGS. 1 through 2 thereof, a new gravity actuated torque generator embodying the principles and concepts of the present invention and generally designated by the reference numeral 10 will be described.

As best illustrated in FIGS. 1 through 2, the gravity actuated torque generator 10 generally comprises a support assembly, a drive assembly being supported by the support assembly, and a weight assembly being engagable to the drive assembly for generating torque. The drive assembly includes a drive shaft 40 being rotatably and conventionally depending from the support assembly. The drive shaft 40 has at least one side 17 and includes upper, middle and lower portions 14-16. The drive shaft 40 may be cylindrically-shaped or may have multiple sides with a triangular or polygonal cross-section. The middle portion 15 has a larger perimeter than that of either the upper or lower portions 14, 16. The drive shaft 40 has a first tapered portion 18 interconnecting the upper and middle portions 14,15 and has a second tapered portion 19 interconnecting the middle and lower portions 15,16. The drive assembly also includes a track 20 securely and conventionally depending from the support assembly and being spaced about the drive shaft 40. The track 20 spirals downwardly about the drive shaft 40 and is helical shaped. The drive assembly further includes at least one torque transmitting member 38 such as a gear member being conventionally attached to the drive shaft 40 for powering a generator.

The weight assembly includes a plurality of weight members 21 being rollably, separately, and spatially placed upon the track 20 at a top thereof and being removably and securely disposed about the drive shaft 40 and being urged downwardly upon the track 20 by gravity. The weight assembly further includes a plurality of rollers 41,42 being conventionally mounted to the weight members 21 and being movably and removably positioned upon the track 20 at the top thereof, and also includes a plurality of wheels 43,44 being conventionally mounted to the weight members 21 and being engagable to the drive shaft 40 to rotate the drive shaft 40 as the weight members 21 move downwardly upon the track 20 and about the drive shaft 40 because of gravitational forces. The wheels 43,44 are not engagable to the upper and lower portions 14,16 of the drive shaft 40 but are engagable to the middle portion 15 of the drive shaft 40 so that the weight members 21 are rotating at or nearly at the speed of the drive shaft 40 upon the wheels 43,44 engaging the drive shaft 40 to substantially negate any disruption to the rotating of the drive shaft 40. Each of the weight members 21 has a main body 22 and also has arm members 23,30 extending at an angle from the main body 22. Each of the arm members 23,30 has one of the rollers 41,42 being rollably and conventionally mounted thereto and further having one of the wheels 43,44 being rotatably and conventionally mounted thereto. Each of the arm members 23,30 includes a main portion 24,31 and an end portion 25,32. The main portion 24,32 of each arm member 23,30 has an opening 26,33 disposed therethrough and also has a first axle 28,35 being securely and integrally attached to the arm member 23,30 and traversing the opening 26,33 with one of the rollers 41,42 being rollaby mounted about the first axle 28,35. The end portion 25,32 of each arm member 23,30 has a slot 27,34 being disposed in an end thereof and also has a second axle 29,36 being securely and conventionally attached to the arm member 23,30 and traversing the slot 27,34 with one of the wheels 43,44 being rotatably mounted about the second axle 29,36. Each of the weight members 21 includes more than one section 45,46 being hingedly attached to one another and also being fastenable with fasteners 47,48 to each other about the drive shaft 40 to allow the weight member 21 to be movably positioned upon the track 20 and about the drive shaft 40.

The support assembly includes a first support member 39 being conventionally attached to a building structure 12 and being disposed above a ground and also includes a bearing 37 being conventionally mounted to the first support member 39. The drive shaft 40 has a top portion which is disposed through the bearing with the drive shaft 40 conventionally depending from the first support member 39. The support assembly further includes a second support member 11 also being conventionally attached to a building structure 12 and being disposed above a ground with a top portion of the track 20 being securely and conventionally attacked thereto and the track 20 depending from the second support member 11 and being spaced above the ground to allow the weight members 21 to come off the track 20 at the bottom thereof.

In use, the user fastens the sections 45,46 of a particular weight member 21 together about the drive shaft 40 at the top of the track 20 with the rollers 41,42 being movably placed upon the track 20 with the wheels not engaging the upper portion 14 of the drive shaft 40. Because of gravitational forces and the weight of the weight member 21, the weight member 21 moves downwardly upon the track 20 and also rotates while doing so. The weight member 21 picks up rotational speed as it moves downwardly and upon the track 20 and matches nearly the rotational speed of the drive shaft 40 at which moment the wheels 43,44 engages the middle portion 15 of the drive shaft 40 to continue the rotation of the drive shaft 40 without impeding disruption. More weight members 21 are added one at a time to the top of the track 20 and about the drive shaft 40 to maintain the rotation of the drive shaft 40 thus generating torque. The weight members 21 move down the track 20 and eventually disengage from the drive shaft 40 at the lower portion 16 thereof and come off the track 20 at the bottom thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the gravity actuated torque generator. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A gravity actuated torque generator comprising:
a support assembly;
a drive assembly being supported by said support assembly, said drive assembly including a drive shaft being rotatably depending from said support assembly, said drive assembly also including a track securely attached to and depending from said support assembly and being spaced about and away from said drive shaft; and
a weight assembly being engageable to said drive assembly for generating torque, said weight assembly including a plurality of weight members being rollably, separately, and spatially placed upon said track at a top thereof and being removably and securely disposed about said drive shaft and being urged downwardly upon said track by gravity, said weight assembly further including a plurality of rollers being mounted to said weight members and being movably and removably positioned upon said track at said top thereof, and also including a plurality of wheels being mounted to said weight members and being engageable to said drive shaft to rotate said drive shaft as said weight members move downwardly upon said track and about said drive shaft.

2. A gravity actuated torque generator as described in claim 1, wherein said drive shaft has at least one side and includes upper, middle and lower portions, said middle portion having a larger perimeter than that of either said upper or lower portions.

3. A gravity actuated torque generator as described in claim 2, wherein said drive shaft has a first tapered portion interconnecting said upper and middle portions and has a second tapered portion interconnecting said middle and lower portions.

4. The gravity actuated torque generator as described in, claim 1, wherein said wheels are not engageable to upper and lower potions of said drive shaft but are engageable to a middle portion of said drive shaft so that said weight members are rotating at or nearly at the speed of said drive shaft upon said wheels engaging said drive shaft to substantially negate any disruption to the rotating of said drive shaft.

5. The gravity actuated torque generator as described in claim 1, wherein each of said weight members has a main body with arm members extending therefrom, each of said arm members having one of said rollers being rollably mounted thereto and further having one of said wheels being rotatably mounted thereto.

6. The gravity actuated torque generator as described in claim 5, wherein each of said arm members includes a main portion and an end portion.

7. The gravity actuated torque generator as described in claim 6, wherein said main portion of each said arm member has an opening disposed therethrough and also has a first axle traversing said opening with one of said rollers being rollably mounted about said first axle.

8. The gravity actuated torque generator as described in claim 6, wherein said end portion of each said arm member has a slot being disposed in an end thereof and also has a second axle traversing said slot with one of said wheels being rotatably mounted about said second axle.

9. The gravity actuated torque generator as described in claim 1 wherein said support assembly includes at least one support member being disposed above a ground and also includes a bearing being mounted to said at least one support member, said drive shaft having a top portion which is disposed through said bearing with said drive shaft depending from said at least one support member.

10. The gravity actuated torque generator as described in claim 1, wherein said track includes a top portion which is securely attached to said at least one support member with said track depending from said at least one support member and being spaced above a ground to allow said weight members to come off said track.

11. A gravity actuated torque generator comprising:

A support assembly;

A drive assembly being supported by said support assembly, said drive assembly including a drive shaft being rotatably depending from said support assembly, said drive assembly also including a track securely attached to and depending from said support assembly and being spaced about said drive shaft; and A weight assembly being engageable to said drive assembly for generating torque, said weight assembly including a plurality of weight members being rollably, separately, and spatially placed upon said track at a top thereof and being removably and securely disposed about said drive shaft and being urged downwardly upon said track by gravity, each of said weight members including more than one section being hingedly attached to one another and also being fastenable to each other about said drive shaft to allow said weight member to be movably positioned upon said track and about said drive shaft.

12. A method of using gravity to generate torque including the steps of:

providing a rotatable drive shaft having upper, middle and lower portions with said middle portion having a larger perimeter than that of either said upper and lower portions, and providing a track being spirally disposed about said rotatable drive shaft, and also providing a plurality of weight members;

positioning one of said weight members upon said track about said rotatable drive shaft;

gravitationally moving said weight member upon said track without engaging said upper portion said rotatable drive shaft;

said weight member engaging and rotating said drive shaft at said middle portion thereof thus generating torque; and said weight member disengaging said drive shaft at said lower portion thereof and dropping of said track at a bottom thereof.

* * * * *